US009435207B2

(12) United States Patent
Elorza Gomez et al.

(10) Patent No.: US 9,435,207 B2
(45) Date of Patent: Sep. 6, 2016

(54) BLADE COMPRISING PRE-WIRED SECTIONS

(75) Inventors: Sergio Elorza Gomez, Munich (DE); Peter Eibelshaeuser, Munich (DE)

(73) Assignee: MTU Aero Engines GmbH, Munich (DE)

( * ) Notice: Subject to any disclaimer, the term of this patent is extended or adjusted under 35 U.S.C. 154(b) by 938 days.

(21) Appl. No.: 13/581,275

(22) PCT Filed: Jan. 29, 2011

(86) PCT No.: PCT/DE2011/000084
§ 371 (c)(1),
(2), (4) Date: Aug. 24, 2012

(87) PCT Pub. No.: WO2011/103849
PCT Pub. Date: Sep. 1, 2011

(65) Prior Publication Data

US 2012/0315148 A1 Dec. 13, 2012

(30) Foreign Application Priority Data

Feb. 27, 2010 (DE) ........................ 10 2010 009 615

(51) Int. Cl.
*F04D 29/38* (2006.01)
*F01D 5/14* (2006.01)
*B23P 15/04* (2006.01)

(52) U.S. Cl.
CPC ........... *F01D 5/141* (2013.01); *F05D 2200/26* (2013.01); *Y10T 29/49337* (2015.01)

(58) Field of Classification Search
CPC .......... F01D 5/14; F01D 5/141; F01D 5/142; F01D 5/147; F05D 2200/26; F05D 2200/261; F05D 2200/262; F05D 2200/263; F05D 2230/50; F05D 2240/301; Y10T 29/49336; Y10T 29/49337; B23P 15/02
USPC ............... 416/223 A, 230, 238, 243, DIG. 2; 415/191, 192, 208.1
See application file for complete search history.

(56) References Cited

U.S. PATENT DOCUMENTS

| | | | | |
|---|---|---|---|---|
| 4,652,212 | A | 3/1987 | Burger et al. | |
| 5,342,170 | A | 8/1994 | Elvekjaer et al. | |
| 6,331,100 | B1 * | 12/2001 | Liu et al. | 416/238 |
| 2006/0275134 | A1 | 12/2006 | Hasenjager et al. | |
| 2007/0053779 | A1 | 3/2007 | Guemmer | |
| 2010/0050594 | A1 * | 3/2010 | Lombard et al. | 60/204 |

FOREIGN PATENT DOCUMENTS

| | | | |
|---|---|---|---|
| DE | 34 41 115 | C1 | 1/1986 |
| DE | 42 28 879 | A1 | 3/1994 |
| DE | 10 2005 025 213 | A1 | 12/2006 |

(Continued)

OTHER PUBLICATIONS

PCT/DE2011/000084 PCT/ISA/210, dated Aug. 30, 2011, 3 pages.

*Primary Examiner* — Craig Kim
*Assistant Examiner* — Alexander White
(74) *Attorney, Agent, or Firm* — Crowell & Moring LLP

(57) ABSTRACT

A blade for a blade row of a turbomachine having wired sections, in particular a blade of a compressor rotor blade, as well as a method for wiring sections of such a blade, is disclosed. Sections of a blade are wired in such a way that a first central component of a second section is selected according to at least one central component of a first section.

2 Claims, 2 Drawing Sheets

(56) References Cited

FOREIGN PATENT DOCUMENTS

| | | | |
|---|---|---|---|
| DE | 10 2005 042 115 | A1 | 3/2007 |
| DE | 10 2006 055 869 | A1 | 5/2008 |
| EP | 0 798 447 | A2 | 10/1997 |
| EP | 1 106 836 | A2 | 6/2001 |
| GB | 2 151 310 | A | 7/1985 |

* cited by examiner

PRIOR ART

BLADE COMPRISING PRE-WIRED SECTIONS

This application claims the priority of International Application No. PCT/DE2011/000084, filed Jan. 29, 2011, and German Patent Document No. 10 2010 009 615.6, filed Feb. 27, 2010, the disclosures of which are expressly incorporated by reference herein.

BACKGROUND AND THE INVENTION

The invention relates to a blade for a blade row of a turbomachine having wired sections, in particular a blade of a compressor rotor blade, as well as a method for wiring sections of such a blade.

In particular in order to adapt individual sections in the radial direction to flow conditions that vary radially over a channel height of a blade row, especially the flow vectors at the inlet and outlet, building up the three-dimensional geometry (3D geometry) of a blade from successive sections in the radial direction, preferably 2D sections, i.e., wiring the sections, is known, for example from the applicant's EP 0 798 447 A2 and DE 10 2006 055 869 A1. Both these publications, along with DE 10 2005 042 115 A1, DE 34 41 115 C1 and DE 10 2005 025 213 A1, are concerned with the geometry of the individual sections, in particular the skeleton lines thereof.

Especially in the case of compressor rotor blades having a sweep in the axial direction, lateral bending stress occurs in the blade as a result of wiring in the peripheral direction, i.e., with sections that are offset from one another in the peripheral direction.

Therefore, the object of the present invention is making available an improved blade for a blade row of a turbomachine.

According to the invention, sections of a blade are wired in such a way that a first central component of a second section is selected according to at least one central component of a first section.

The central point of a section may in particular be the position $r_c$ of the mid-point of its area $$\underbrace{[x_C \;\; r_C \;\; \Theta_C]}_{r_C} = \frac{1}{F}\int_F r_{dF}\cdot dF \qquad (1)$$

with components $x_c$ in the axial direction, $r_c$ in the radial direction and $\Theta_C$ in the peripheral direction and the vector $r_{dF}$ for the infinitesimal element dF of the section area F, preferably the position $r_{CG}$ of its center of mass or center of gravity $$\underbrace{[x_{CG} \;\; r_{CG} \;\; \Theta_{CG}]}_{r_{CG}} = \frac{1}{M}\int_M r_{dM}\cdot dM \qquad (1')$$

with the vector $r_{dM}$ for the infinitesimal mass element dM and the corresponding central component $x_{CG}$ in the axial direction, $r_{CG}$ in the radial direction and $\Theta_{CG}$ in the peripheral direction, wherein reference is made in particular to a standard coordinate system, whose axial coordinate aligns with a longitudinal axis of the flow grid or of the turbomachine.

According to the invention, at least one of these components, which, for purposes of a more compact representation, is called the first central component, is now selected, preferably recursively, for a second section in accordance with one or more central component of a first section that is preferably preceding radially outwardly in the radial direction, i.e., a radially inward first section. This makes a wiring of subsequent sections possible in an optimal manner with respect to the central points thereof.

In doing so, according to a preferred embodiment, the individual sections, in particular the geometry or outer contour thereof, are first of all configured, preferably optimized, fluid dynamically, in particular aerodynamically, and then wired according to the invention, i.e., according to central points of a preceding section. In this way, it is possible to do justice to both fluid dynamics as well as strength demands separately and therefore optimally.

According to a preferred embodiment, a first central component of the second section selected according to the invention is also selected according to its graduated angle and/or according to a graduated angle of the first section. In this case, the graduated angle at the blade-starting side or at the blade-end side or the angle enclosing a chord between the blade leading edge and the blade trailing edge or a profile skeleton line with a row plane of the blade row is designated in a standard manner as the graduated angle or blade angle $\beta$ of a section.

Additionally or alternatively, the first central component of the second section may also be selected according to at least one other, second central component of the second section. For example, it is possible, for instance for fluid dynamic reasons, to first determine an axial central point, i.e., a central component in the axial direction, for the second section and then select its central peripheral position, i.e., its central component in the peripheral direction, also according to this axial central point.

If, for example, the center of mass or the center of gravity of a radially inner first section (i) is known by its location or position $x_{CG(i)}$ in the axial direction, $r_{CG(i)}$ in the radial direction and $\Theta_{CG(i)}$ in the peripheral direction as well as its graduated angle $\beta_{(i)}$, and the axial and radial position $x_{CG(i+1)}$, $r_{CG(i+1)}$ of the center of mass of a radially subsequent second section (i+1) as well as its graduated angle $\beta_{(i+1)}$ are given, for instance based on fluid dynamic conditions, then according to a preferred embodiment, the central peripheral position $\Theta_{CG(i+1)}$ of the second section (i+1) obeys at least approximately the relation:

$$\Theta_{CG(i+1)} = \Theta_{CG(i)} + \mathrm{Arctan}\left[\frac{2\cdot(x_{CG(i+1)} - x_{CG(i)})}{(r_{CG(i+1)} + r_{CG(i)})}\cdot\tan\left(\frac{\beta_{(i+1)} + \beta_{(i)}}{2}\right)\right], \qquad (2)$$

where "tan" and "arctan" designate in standard nomenclature the tangent or the arc tangent of an angle. One can see that the offset $(\Theta_{CG(i+1)}-\Theta_{CG(i)})$ of the center of gravity of the second section from the first section in the peripheral direction depends on the offset $(x_{CG(i+1)}-x_{CG(i)})$ in the axial direction as well as a mean value $(r_{CG(i+1)}+r_{CG(i)})/2$ for the radial position and an averaged graduated angle $(\beta_{CG(i+1)}+\beta_{CG(i)})/2$.

It is preferred that essentially all sections of the blade obey this relation at least approximately. In particular, in order to equalize local stress, it may be advantageous, however, if radially inward sections deviate herefrom. Therefore, preferably at least radially outward sections meet the above relation, in particular all sections starting from 35% of a channel height of the blade row, preferably starting from 25% of the channel height upwards.

For simplification, instead of the mean value ($r_{CG(i+1)}$+$r_{CG(i)}$/2, the radial position $r_{CG(i)}$ or $r_{CG(i+1)}$ of the first or second sections may be used so that the central component $\Theta_{CG(i+1)}$ of the second section (i+1) at least approximately obeys for example the relation:

$$\Theta_{CG(i+1)} = \Theta_{CG(i)} + \mathrm{Arctan}\left[\frac{(x_{CG(i+1)} - x_{CG(i)})}{(r_{CG(i+1)})} \cdot \tan\left(\frac{\beta_{(i+1)} + \beta_{(i)}}{2}\right)\right] \quad (2')$$

Additional or alternatively, the graduated angle $\beta_{(i)}$ or $\beta_{(i+1)}$ of the first or second section may also be used approximately so that the central component $\Theta_{CG(i+1)}$ of the second section (i+1) at least approximately obeys for example the relation $$\Theta_{CG(i+1)} = \Theta_{CG(i)} + \mathrm{Arctan}\left[\frac{(x_{CG(i+1)} - x_{CG(i)})}{(r_{CG(i+1)})} \cdot \tan(\beta_{(i+1)})\right] \quad (2'')$$

For example, in order to equalize fluid forces, in particular gas forces, the blade may be inclined in the circumferential direction by the angle $\Theta_{lean}$. Then the following term may be added to the central component $\Theta_{CG(i+1)}$ of the second section (i+1) according to one of the relations explained in the foregoing:

$$\mathrm{Arcsin}\left[\frac{(r_{CG(i+1)} - r_{CG(1)})}{(r_{CG(i+1)})} \cdot \sin(\Theta_{lean})\right] \quad (3)$$

so that the central component $\Theta_{CG(i+1)}$ of the second section (i+1) at least approximately obeys the relation:

$$\Theta_{CG(i+1)} = \quad (2''')$$
$$\Theta_{CG(i)} + +\mathrm{Arctan}\left[\frac{2 \cdot (x_{CG(i+1)} - x_{CG(i)})}{(r_{CG(i+1)} + r_{CG(i)})} \cdot \tan\left(\frac{\beta_{(i+1)} + \beta_{(i)}}{2}\right)\right] +,$$
$$+\mathrm{Arcsin}\left[\frac{(r_{CG(i+1)} - r_{CG(1)})}{(r_{CG(i+1)})} \cdot \sin(\Theta_{lean})\right]$$

Additional features and advantages are disclosed in the subordinate claims and the exemplary embodiment.

DETAILED DESCRIPTION OF THE DRAWINGS

Figure 2B:
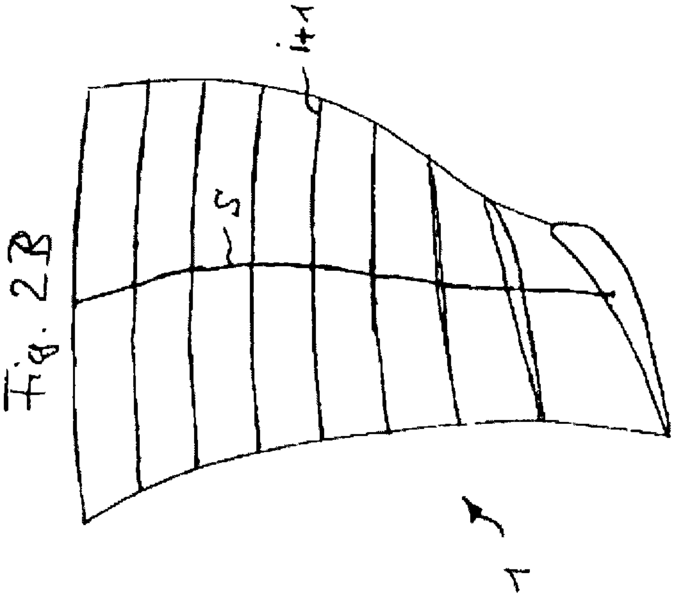
FIG. 2A, 2B illustrate a blade according to an embodiment of the present invention in a view corresponding to FIG. 1A or FIG. 1B.
Figure 2A:
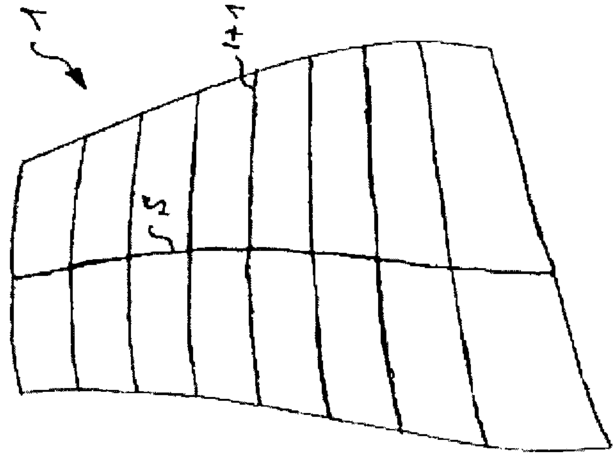

FIGS. 2A and 2B show a meridional or axial view of a blade 1 of a compressor rotor blade according to an embodiment of the present invention. Some wired sections are sketched in by way of example, a second of which is designed by “i+1”.

To create the 3D geometry of this blade, the individual sections are first produced under aerodynamic aspects, in which for example the skeleton line and the construction circles thereof are specified or optimized. Then, beginning with a radially innermost section at the base of the flow channel, the axial centers of gravity of the sections are specified recursively. For each section at least starting at 25% of the height of the channel upward (from the bottom to the top in FIG. 2), the center of gravity thereof in the peripheral direction is selected according to the relation (2) or (2''') so that ultimately the complete 3D geometry of this blade, which is optimal both in terms of aerodynamics as well as strength, is produced without time-consuming and costly aero strength iterations having to be carried out.

Figure 1B:
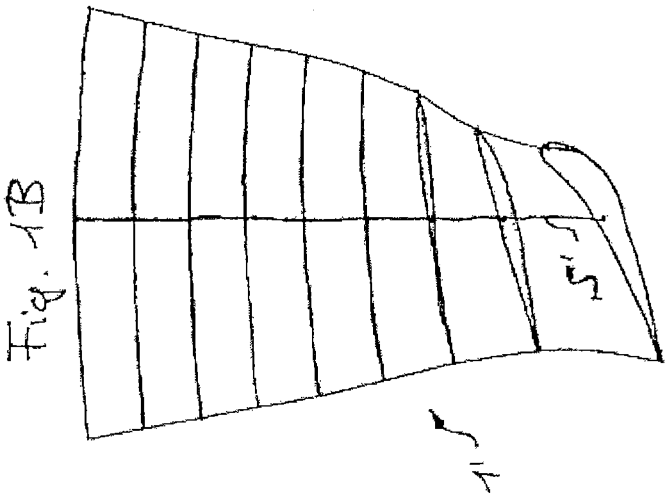
FIG. 1B is an axial view of the blade from FIG. 1A.
Figure 1A:
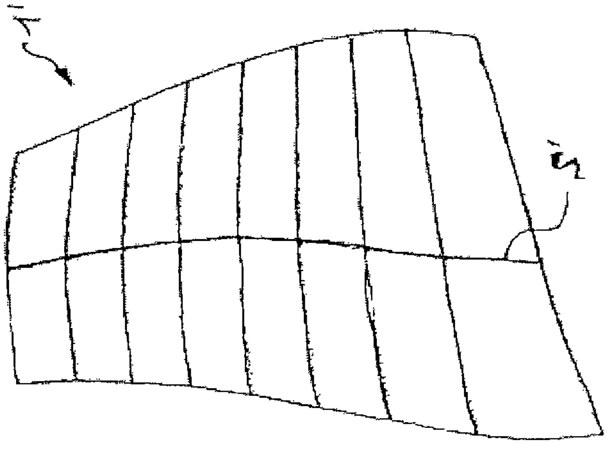
PRIOR ART Fig. 1A
FIG. 1A is a meridional view of a blade having wired sections according to the prior art.

In comparison to the prior art blade 1' depicted in corresponding views in FIG. 1A, 1B, one can see the more favorable, curved progression of the centers of gravity, which are connected in the figures by a line S or S', over the channel height.

The invention claimed is:

1. A method for forming a blade (1) for a blade row of a turbomachine, comprising:

selecting a first central component ($\Theta_{CG(i+1)}$) of a second section ((i+1)) of the blade according to at least one central component ($\Theta_{CG(i)}$, $x_{CG(i)}$, $r_{CG(i)}$) of a first section ((i)) of the blade;

wherein the first central component ($\Theta_{CG(i+1)}$) of the second section ((i+1)) is selected as a first central component in a peripheral direction essentially according to:

$$\Theta_{CG(i+1)} = \Theta_{CG(i)} + \mathrm{Arctan}\lfloor A \cdot (x_{CG(i+1)} - x_{CG(i)}) \cdot \tan B \rfloor + C$$

with $$A \in \left\{\frac{2}{(r_{CG(i+1)} + R_{CG(i)})}, \frac{1}{r_{CG(i)}}, \frac{1}{r_{CG(i+1)}}\right\};$$

$$B \in \left\{\frac{\beta_{(i+1)} + \beta_{(i)}}{2}, \beta_{(i)}, \beta_{(i+1)}\right\};$$

$$C \in \left\{\mathrm{Arcsin}\left[\frac{(r_{CG(i+1)} - r_{CG(1)})}{(r_{CG(i+1)})} \cdot \sin(\Theta_{lean})\right], 0\right\}$$

where:

(i) is a variable of the first section;

(i+1) is a variable of the second section;

$\Theta_{CG}$ is a central component of a section in the peripheral direction;

$x_{CG}$ is a central component of a section in an axial direction;

$r_{CG}$ is a central component of a section in a radial direction;

$\beta$ is a graduated angle of a section; and $\Theta_{lean}$ is a peripheral incline; and forming the blade by wiring the first section and the second section of the blade.

2. The method according to claim 1, wherein a central peripheral position ($\Theta_{CG(i+1)}$) for all sections ((i+1)) is selected according to $$\Theta_{CG(i+1)} = \Theta_{CG(I)} + \mathrm{Arctan}\lfloor A \cdot (x_{CG(i+1)} - x_{CG(i)}) \cdot \tan B \rfloor + C$$

for which a difference ($r_{CG(I+1)} - r_{CG(I)}$) between the central component thereof and a central component in the radial direction of a radially inward channel base is at least 35% of a channel height of the blade row.

* * * * *